(12) United States Patent
Al Bahrani et al.

(10) Patent No.: US 11,965,606 B1
(45) Date of Patent: Apr. 23, 2024

(54) METHOD AND SYSTEM FOR AUTOMATING OPERATION OF MANUAL WELLHEAD VALVES

(71) Applicant: SAUDI ARABIAN OIL COMPANY, Dhahran (SA)

(72) Inventors: Jafar Ibrahim Al Bahrani, Alhufuf (SA); Emad Abbad M. Alabbad, Dammam (SA); Shaima Hussain Alshawaf, Alhassa (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/146,902

(22) Filed: Dec. 27, 2022

(51) Int. Cl.
*F16K 31/05* (2006.01)
*E21B 34/02* (2006.01)
*F16K 31/46* (2006.01)

(52) U.S. Cl.
CPC .............. *F16K 31/05* (2013.01); *E21B 34/02* (2013.01); *F16K 31/46* (2013.01)

(58) Field of Classification Search
CPC ........... F16K 31/05; F16K 31/46; E21B 34/02
See application file for complete search history.

(56) References Cited

U.S. PATENT DOCUMENTS

| 5,173,855 | A | * | 12/1992 | Nielsen | G05B 19/0426 239/69 |
| 6,125,868 | A | * | 10/2000 | Murphy | F16K 31/46 702/41 |
| 9,016,662 | B2 | | 4/2015 | Staffiere et al. | |
| 10,704,708 | B2 | * | 7/2020 | Ferrar | B25J 19/0004 |

FOREIGN PATENT DOCUMENTS

| CN | 106462168 | A | | 2/2017 |
| KR | 101320608 | B1 | * | 10/2013 |
| KR | 102275195 | B1 | * | 7/2021 |

* cited by examiner

*Primary Examiner* — Marina A Tietjen
(74) *Attorney, Agent, or Firm* — Vorys, Sater, Seymour and Pease, LLP

(57) ABSTRACT

An automatic valve actuation system includes an actuation device, one or more arms operatively coupled to and extending from the actuation device, and a stem adapter attached to a distal end of the one or more arms to operatively couple the one or more arms to a valve stem of a manually-operable valve. Operation of the actuation device rotates the one or more arms and correspondingly rotates the valve stem to open or close the manually-operable valve.

20 Claims, 4 Drawing Sheets

METHOD AND SYSTEM FOR AUTOMATING OPERATION OF MANUAL WELLHEAD VALVES

FIELD OF THE DISCLOSURE

The present disclosure relates generally to wellhead integrity services and, more particularly, to the automated operation of manual wellhead valves for wellhead valve integrity services.

BACKGROUND OF THE DISCLOSURE

Integrity testing and greasing of wellhead valves are integral to well integrity surveillance programs, which may be carried out on oil, gas, or water wells. In these tests, the integrity of wellhead valves such as crown valves, master valves, wing valves, kill valves, and annuli valves is assessed. The integrity testing may be further performed on flowline valves, such as choke valves, plot limit valves, and isolation valves to ensure that the valves are capable of isolating and holding the fluid flow and pressure under any operating conditions. The wellhead and flowline valves are critical assets which require proper maintenance to ensure their functionality according to design specifications, such that it is guaranteed that the well may be properly controlled when necessary.

Maintenance of the wellhead and flowline valves aids in the reduction of friction, corrosion-induced damage, debris and/or sludge accumulation, and any other flow impedances through the minimization of direct contact of valve components with the crossing fluid. Proper lubrication improves the performance and the life of the valve, and may be utilized as a temporary remedial action to prevent minor valve leaks. The service interval for integrity testing and greasing may vary according to valve application, fluids utilized, and conditions of the well, and this service interval may be extended through proper pressure equalization prior to valve opening.

However, to properly perform these services, many valves must be opened and closed manually during the service procedure. Based upon the size of the valve and the manufacturer, the revolutions required for actuating each valve may vary from ten revolutions to 100 or more revolutions. Consequently, these manual valves may require operators to provide a large amount of physical exertion, particularly when actuating valves that may be stuck or overtightened. The challenges associated with manual valve actuation may increase the risk of operator injury, and may additionally lead to operators skipping or performing poor service on critical valve integrity activities.

Accordingly, an improved system and method for opening manual wellhead valves is desirable for optimal operation of wellhead procedures.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, an automatic valve actuation system includes an actuation device, one or more arms operatively coupled to and extending from the actuation device, and a stem adapter attached to a distal end of the one or more arms to operatively couple the one or more arms to a valve stem of a manually-operable valve. Operation of the actuation device rotates the one or more arms and correspondingly rotates the valve stem to open or close the manually-operable valve.

In a further embodiment, a method of actuating a valve includes placing an actuation device near the valve, the actuation device including a motor operatively coupled to one or more arms extending from the actuation device, operatively coupling a distal end of the one or more arms to a valve stem of the valve, and operating the actuation device and thereby rotating the one or more arms to rotate the valve stem between an open position and a closed position.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
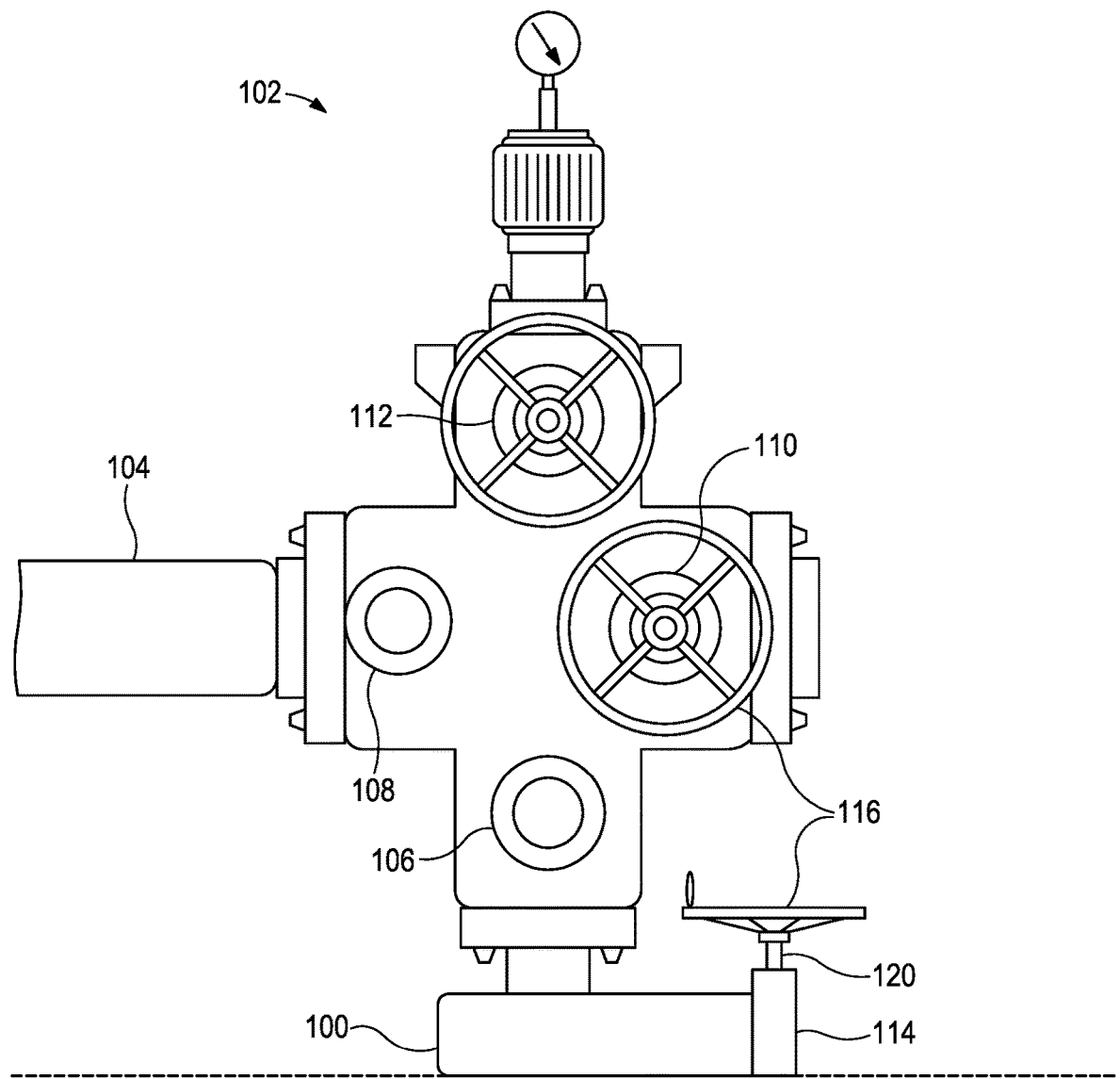
FIG. 1 is an example schematic of a wellhead installed at a surface location.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to wellhead integrity services and, more particularly, to the automated operation of manually-operated wellhead valves for wellhead valve integrity services. The embodiments presented herein may prove advantageous in helping to eliminate the physical effort and risks involved in the actuation of wellhead valves, and enable operators to automatically open and close the manual valves of the wellhead to undertake wellhead integrity services. Moreover, the portable, remotely operated systems disclosed herein may be adjusted to fit a variety of manual valve sizes and configurations while also accessing different locations at different orientations.

FIG. 1 is a schematic of an example wellhead 100 that may benefit from the principles of the present disclosure. The wellhead 100 may be installed at a well surface location and assembled as a means of containing pressure within a wellbore (not shown) extending from the wellhead 100. The pressure within the well may be regulated by a production tree 102, which includes a series of valves, spools, and fittings installed on the wellhead 100. The production tree 102, sometimes referred to as a "Christmas tree," is used to control the flow of production fluids out of the well and into tubing 104, for example, which conveys the production fluid away from the well. Alternatively, or in addition thereto, the production tree 102 may be used for controlling the injection of fluids into the well to provide lift or as storage.

As illustrated, the production tree 102 includes a number of valves which are employed in the control of fluid flow in or out of the well, such as a middle master valve 106, a wing valve 108, a kill valve 110, a crown valve 112, and a lower master valve 114. Those skilled in the art will readily appreciate that the production tree 102 may include a variety of additional valves which may be applicable to the disclosed embodiments, without departing from the scope of this disclosure.

During wellhead integrity testing, one or more of the valves 106-114 may require actuation and lubrication to ensure proper functionality of the production tree 102. To actuate manual valves, such as the kill valve 110, the crown valve 112, and/or the lower master valve 114, each manual valve 110-114 may include a handwheel 116 that is manually rotatable by an operator to open or close the valve 110-114. Referring to the lower master valve 114, the handwheel 116 may be operatively coupled to a valve stem 120, which transfers rotational energy from the handwheel 116 to the valve stem 120, thus facilitating actuation (opening or closing) of the lower master valve 114. While not shown in FIG. 1, the kill valve 110 and the crown valve 112 may include similar features.

Manually actuating the valves 110-114, however, may become difficult if the valves 110-114 are overtightened or if the valves 110-114 are corroded, oxidized (rusted), or components parts have undergone thermal expansion. In addition, depending on the valve design, some valves can require dozens of turns (revolutions) to open or close the valve. For this reason, the utilization of handwheels 116 and other actuation means for these manual valves 110-114 may present a safety hazard requiring greater forces to actuate, and may additionally lead to improper or incomplete maintenance. According to embodiments of the present disclosure, a portable, remotely operated valve actuation system may be used to help eliminate the physical effort and risks of manually actuating manual valves 110-114. The example valve actuation systems described herein enable well operators to automatically open and close manual-operated valves, and can be adjusted to fit different manual valve sizes, locations, and orientations.

Figure 2:
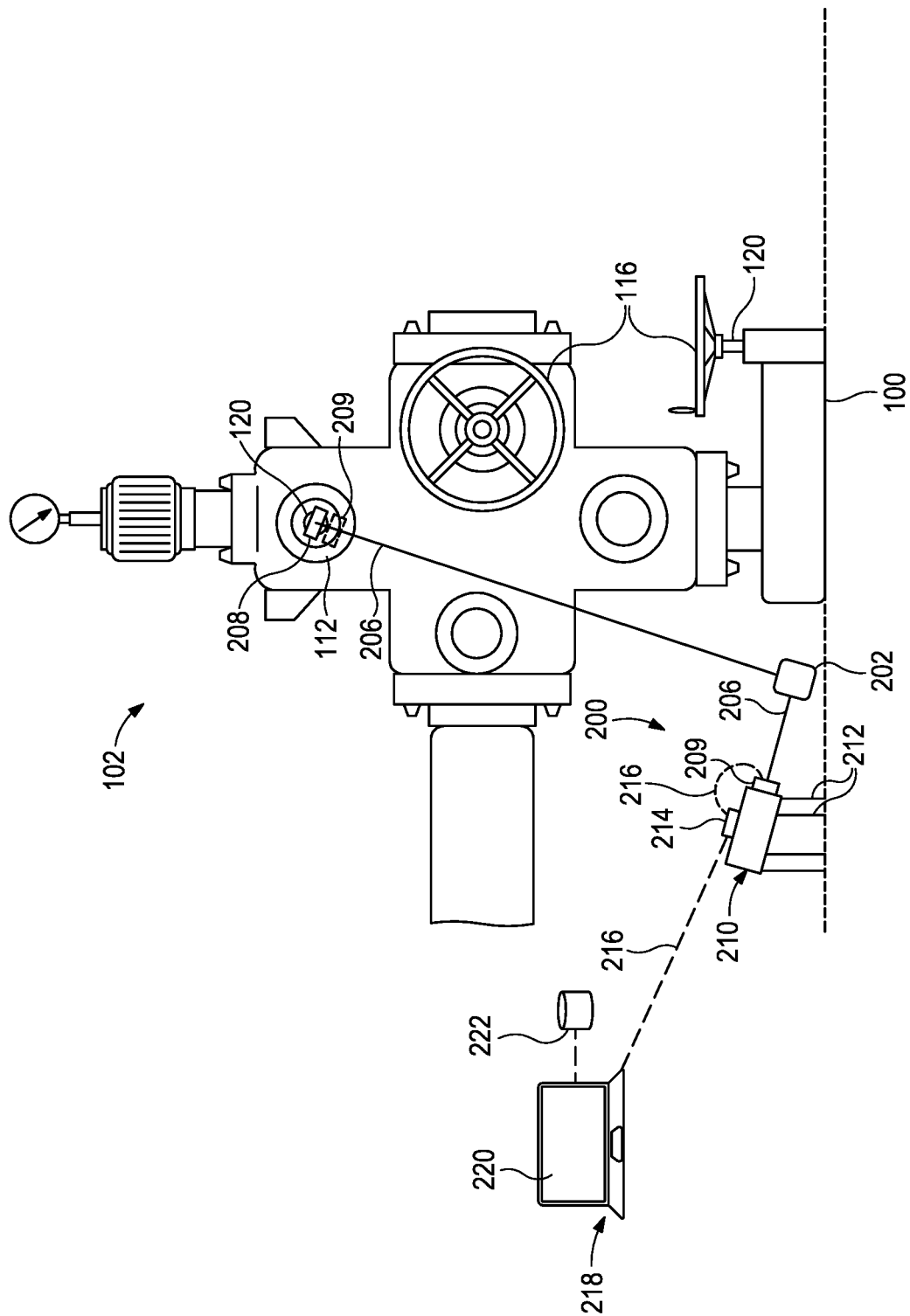
FIG. 2 is an example schematic of an automatic valve actuation system installed on the production tree of the wellhead.

FIG. 2 is a schematic diagram of an example automatic valve actuation system 200 that may be used in conjunction with the production tree 102, according to one or more embodiments. In the illustrated embodiment, the automatic valve actuation system 200 (hereinafter "the system 200") is being used and otherwise installed on the crown valve 112, but could alternatively be used with any of the other manual valves included in the production tree 102.

As illustrated, the system 200 includes an actuation device 210 and one or more arms 206 operatively coupled to and extending from the actuation device 210. As will be described in more detail below, the actuation device 210 includes a motor or other type of prime mover operable to rotate the arm(s) 206. In some applications, a transfer joint 202 may be included in the system 200 to interconnect opposing ends of two contiguous arms 206 extending from the actuation device 210. During operation of the system 200, the transfer joint 202 may be used to transmit torque (rotational energy) from one arm 206 to a contiguously-connected second arm 206, thus being able to transfer torque to a given valve from a variety of angles and orientations.

The system 200 may be configured to be operatively coupled to a manually-actuatable valve, and once properly coupled, the system 200 may be operable to actuate (open or close) the valve. As used herein, the terms "operatively coupled" and "operably coupled" may be used interchangeably, and may each refer to a direct or indirect coupling between separate components or parts. In the illustrated embodiment, the actuation device 210 is operatively coupled to the crown valve 112 via the arm(s) 206 and may be operated to selectively and/or automatically actuate the crown valve 112. In other applications, however, the actuation device 210 may be operatively coupled to any of the manually-actuated valves of the production tree 102 and configured to selectively and/or automatically actuate such valves, without departing from the scope of the disclosure.

To operatively couple the system 200 to the crown valve 112, the handwheel 116 of the crown valve 112 may first be removed. After removing the handwheel 116, the arm(s) 206 may be operatively coupled to the now-exposed valve stem 120 of the crown valve 112. In some embodiments, a valve key or "stem adapter" 208 may be attached to the distal end of the distal-most arm 206, and the stem adapter 208 may be configured to mate with the valve stem 120. The stem adapter 208 may provide flexibility to latch into different sizes of valve stems. In some embodiments the stem adapter 208 may comprise a component specifically designed to operatively couple the distal end of the arm(s) 206 to the valve stem 120.

In embodiments where multiple arms 206 are required to reach the valve stem 120, the transfer joint 202 may interconnect the arms 206 and thereby allow for torque to be applied to the stem adapter 208 and the valve stem 120 from various angles and orientations. In the illustrated embodiment, the system 200 includes two arms 206 interconnected by the transfer joint 202. In some embodiments, the transfer joint 202 may comprise a type of universal joint (or "U-joint) or the like operable to transfer rotational movement between two interconnected arms 206 from a variety of relative angles. In other embodiments, however, the transfer joint 202 may alternatively comprise a rotation direction diverter gear box, alternately referred to as a revolution diverter gear box (RDGB), that houses intermeshed gears (e.g., corresponding bevel gears) that allow the transfer joint 202 to redirect rotational movement between two interconnected arms 206 and into four 90° directions to suit valve orientation from the actuation device 210 to the valve stem 120. Accordingly, the transfer joint 202 may be used when the actuation device 210 is unable to be oriented face-to-face with the valve stem 120, but is instead oriented to the right, left, top, or below the valve stem 120. The transfer joint 202 may help transfer torque through a variety of orientations to reach the valve stem 120.

In yet other embodiments, the system 200 may not require the transfer joint 202. In such embodiments, the system 200, and more particularly the actuation device 210, may be able to be positioned face-to-face (e.g., aligned horizontally and vertically) with the valve stem 120 and otherwise oriented to directly interface and connect with the valve stem 120 via a single arm 206 extended from the actuation device 210. This configuration will allow direct rotation from the actuation device 210, through the interconnected arm 206, and to the valve stem 120.

In one or more further embodiments, the stem adapter 208 may be omitted and instead replaced with a transfer joint 202. In such embodiments, the transfer joint 202 at the valve stem 120 may be designed to operatively couple the distal end of the distal-most arm 206 to the now-exposed valve stem 120. Moreover, in such embodiments, the transfer joint 202 at the valve stem 120 may include an adjustable, built-in knob adapter which enables the transfer joint 202 to connect the arms 206 to a variety of different sizes of the valve stem 120.

In some embodiments, the system 200 may include a revolution counter 209 configured to monitor and record the number of rotations (revolutions) applied to the valve stem 120. Tracking the number of revolutions in real-time may be important so as not to exceed the physical constraints of the given valve (e.g., the crown valve 112) based on its design specifications. Moreover, tracking the number of revolutions may prove advantageous in alerting a user in real-time whether the valve is fully open or fully closed, or whether there may be an obstruction preventing the valve from fully opening or closing.

The revolution counter 209 may be arranged in a variety of locations capable of physically tracking and monitoring the revolutions of the arms 206 and, therefore, the valve stem 120. In the illustrated embodiment, the revolution counter 209 is arranged at a direct interface between the arm(s) 206 and the actuation device 210 and, more particularly, operatively coupled to the proximal end of the proximal-most arm 206, which is operatively coupled to the actuation device 210. It should be noted, however, that the revolution counter 209 may be installed at any location or interface along the arm(s) 206 or within the system 200 to count revolutions, without departing from the scope of this disclosure. In at least one embodiment, for example, the revolution counter 209 (shown in dashed lines) may be arranged at or near the interface between the arm(s) 206 and the valve stem 120 such that the number of revolutions of the arms(s) 206 may correspond directly to the number of revolutions of the valve stem 120. This location may prove advantageous in the event there is a gear reduction at the transfer joint 202 that interconnects opposing ends of two contiguous arms 206.

The actuation device 210 may include a plurality of adjustable legs 212 that allow the body or housing of the actuation device 210 to be deployed and set at a multitude of angles relative to the valve to be actuated. As shown in FIG. 2, the actuation device 210 includes at least four adjustable legs 212, which have been adjusted and "set" such that the actuation device 210 is angled downward relative to horizontal. This may help achieve an approximate 90° angle for the transfer joint 202 to operatively couple the arms 206 to the valve stem 120. The downward angle of the actuation device 210 has been achieved by extending the adjustable legs 212 at the rear to a greater height than the adjustable legs 212 at the front of the actuation device 210. In other applications, the adjustable legs 212 may be modified (adjusted) such that the actuation device 210 is oriented upward, parallel with horizontal (i.e., level), or any angle between upward, level, and downward, and depending upon the desired application.

In some embodiments, the system 200 may further include a communication element 214 which may send and/or receive data. The communication element 214 may be in communication with a control system 218 via a communications link 216. In some embodiments, the communication element 214 may be wired to the control system 218, and in such embodiments, the communications link 216 may comprise a cable or wire extending between the communication element 214 and the control system 218. In other embodiments, the communications link 216 may comprise a wireless communication link configured to transmit a wireless signal, such as a Bluetooth, WiFi, or cellular communication signal. The revolution counter 209 may be communicatively coupled to the communication element 214, or the control system 218 directly, such that the number of counted revolutions is communicated to the control system 218. In the illustrated embodiment, the connection between the revolution counter 209 and the communication element 214 may be facilitated through the actuation device 210 or through an external communications link 216 which may enable the revolution counter 209 to be placed elsewhere throughout the system 200.

The communications link 216 may enable interfacing (communicating) the actuation device 210 with the control system 218. In embodiments where the communications link 216 comprises a communication cable or a Bluetooth signal, the control system 218 may be located near the actuation device 210. In other embodiments, however, the control system 218 may be located at a remote location such that communication between the actuation device 210 and the control system 218 is performed over the internet or cellular networks.

The control system 218 may enable an operator to remotely operate the actuation device 210, and thereby actuate the crown valve 112 without requiring the presence of a well operator to physically monitor the speed, number of revolutions, and other factors involved in the actuation of the valve 112. The control system 218 may include at least an electronic interface 220 (e.g., a graphical user interface or "GUI"), which provides a data read out and a mechanism for controlling the actuation device 210, and a data storage element 222. Non-limiting examples of the control system 218 include, but are not limited to, a laptop, a mobile phone, or a tablet. In at least one embodiment, the control system 218 may be communicably coupled to the revolution counter 209 which communicates to the control system 218 the speed and revolutions of the actuation device 210.

Figure 3:
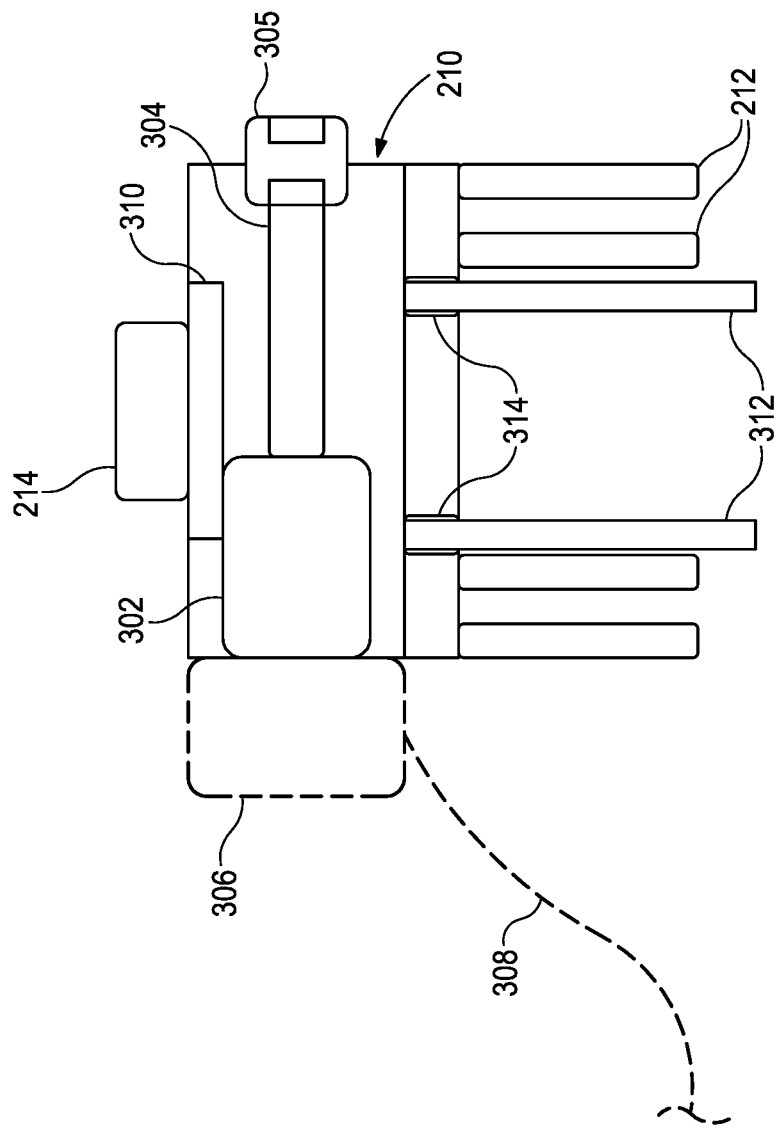
FIG. 3 is an example schematic cross-sectional side view of the actuation device, according to one or more embodiments of the present disclosure.

FIG. 3 is an example, partial cross-sectional side view of the actuation device 210, according to one or more embodiments of the present disclosure. FIG. 3 illustrates some example mechanisms of the actuation device 210, according to at least one embodiment. As illustrated, the actuation device 210 may include a motor 302 operable to provide the rotational energy required to operate the system 200 (FIG. 2). In the illustrated embodiment, the motor 302 may be configured to rotate a drive shaft 304, which may be operatively coupled to a coupling 305 configured to transfer the rotational energy (torque) from the motor 302 to the arms 206 (FIG. 2).

In some embodiments, the motor 302 may be powered by a portable energy source 306, such as a battery pack that enables the actuation device 210 to be fully portable. In other embodiments, however, the motor 302 may be connected to a power cable 308 configured to provide local power to the actuation device 210 from an external power source, such as building power.

In some embodiments, the actuation device 210 may further include a control element 310. The control element 310 may include a processor and a data storage device that enables the motor 302 to communicate with the communication element 214 and thereby facilitate remote operation. In some embodiments, the control element 310 may read instructions provided to the communication element 214 from the control system 218 (FIG. 2), and alter operation of the motor 302 accordingly. In further embodiments, the control element 310 may be in communication with the revolution counter 209 (FIG. 2), either wired or wirelessly, and programmed to receive and record the number or revolutions of the arm(s) 206 and/or the valve stem 120 (FIG. 2). In yet other embodiments, the control element 310 may be programmed to receive and record the number of rotations of the drive shaft 304 in real-time and report the value to the control system 218 via the communication element 214. In at least one embodiment, for example, the number of rotations of the drive shaft 304 may correspond to the number of rotations of the arm(s) 206 and/or the valve stem 120.

As previously discussed, the actuation device 210 may include a plurality of legs 212 that are adjustable to enable the actuation device 210 to be oriented at a variety of angles relative to a given valve. The actuation device 210 may further include a plurality of support arms 312 that provide further stability and adjustability to the actuation device 210. In some embodiments, the support arms 312 may be configured to provide lateral support to the actuation device 210. In other embodiments, or in addition thereto, the support arms 312 may extend below the adjustable legs 212, as shown in FIG. 3, such that the support arms 312 may be at least partially inserted into an underlying surface, floor, or substrate to anchor the actuation device 210 against lateral or horizontal movement. The support arms 312 may be fastened directly to the actuation device 210, or may be inserted into a plurality of apertures 314 defined within the actuation device 210 as shown.

Figure 4:
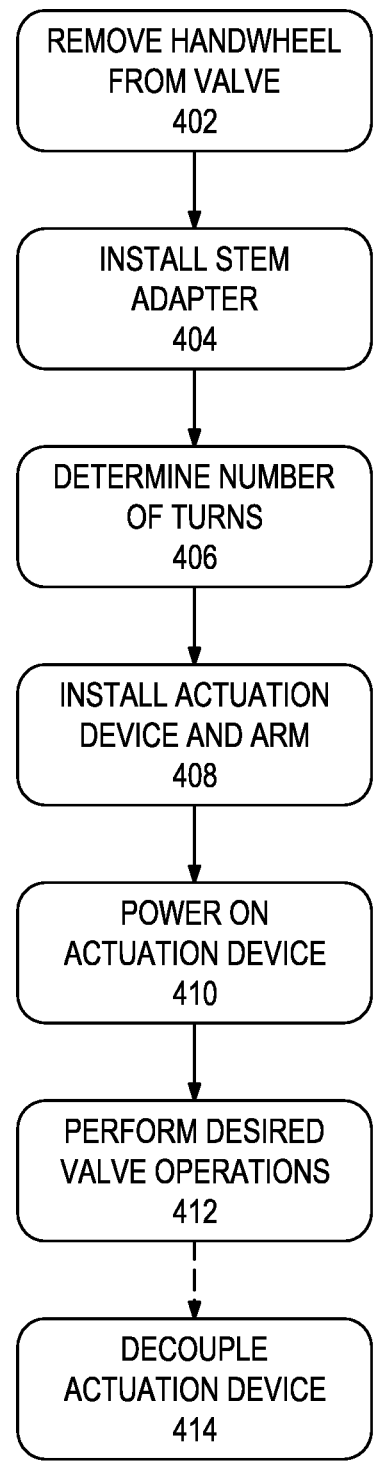
FIG. 4 is an example flowchart for a method of operating an automatic valve actuation system.

FIG. 4 is a flowchart of an example method 400 of actuating an automatic valve actuation system (e.g., the automatic valve actuation system 200). The method 400 may begin at 402 with the removal of a handwheel (e.g., the handwheel 116) from the valve to be actuated (e.g., the crown valve 112). In some embodiments, the valve may form part of a production tree (e.g., the production tree 102) installed at a wellhead (e.g., the wellhead 100). In some embodiments, removing the handwheel may not be necessary for valves which do not include manual actuation devices (e.g., the wing valve 108 of FIG. 1).

The method 400 may continue at 404 with the installation of a valve key or stem adapter (e.g., the stem adapter 208), or other means for interfacing with the valve to be actuated. For example, the stem adapter may be operatively coupled to the distal end of one or more arms (e.g., the arms 206) extending from the actuation device. In embodiments that include multiple arms, a transfer joint (e.g., the transfer joint 202) may operatively couple opposing ends of contiguous arms, thus allowing the arms 206 to reach the valve stem of a valve from a variety of angles and orientations.

At 406, the size, type, and/or manufacturer of the valve may be assessed in order to determine the number of turns required to fully actuate the valve. The determination of the number of turns at 406 may further include a determination of the torque to be applied in order to initiate the actuation. At 408, an actuation device (e.g., the actuation device 210) may be installed as part of the automatic valve actuation system, and the actuation device may be operatively coupled to the valve stem using one or more arms (e.g., the arms 206) extending from the actuation device. As discussed at 404, a valve key or stem adapter (e.g., the stem adapter 208) may be arranged at the distal end of the arms to interface with the valve stem and thereby operatively couple the arms to the valve stem. The installation of the actuation device may include the adjustment of one or more adjustable legs (e.g., the adjustable legs 212) of the actuation device to provide a preferred angular orientation and bias, and may also include the connection of the actuation device to a power source via a cable (e.g. the power cable 308).

With the automatic valve actuation system installed and operatively coupled to the valve at 408, and the specifications corresponding to the valve obtained at 406, the actuation device may be powered on at 410. With a powered actuation device, the automatic valve actuation system may be used to perform the desired valve operations, including valve integrity testing and lubrication, at 412. The performance of these operations, as well as the actuation of the valves may be done through manual controls of the actuation device, or remotely using a control system (e.g., the control system 218). The control system may be communicably coupled to the actuation device via a communication element (e.g., the communication element 214), such that the actuation and valve operations may be performed at any location. Following the operations performed at 410, the actuation device may be decoupled from the valve and subsequently used in operations on additional valves or at further wellheads. However, in at least one embodiment, the automatic valve actuation system, and the actuation device, are maintained in position, such that the valve may be actuated automatically at will in future uses.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. An automatic valve actuation system, comprising:
an actuation device;
one or more arms operatively coupled to and extending from the actuation device;
a plurality of legs operatively coupled to the actuation device and adjustable to orient the actuation device at a variety of angles relative to horizontal; and
a stem adapter attached to a distal end of the one or more arms to operatively couple the one or more arms to a valve stem of a manually-operable valve,
wherein operation of the actuation device rotates the one or more arms and correspondingly rotates the valve stem to open or close the manually-operable valve.

2. The automatic valve actuation system of claim 1, wherein the one or more arms comprise a first arm and a second arm, the automatic valve actuation system further comprising a transfer joint that interconnects opposing ends of the first and second arms.

3. The automatic valve actuation system of claim 2, wherein the transfer joint comprises a universal joint.

4. The automatic valve actuation system of claim 2, wherein the transfer joint comprises a gear box that houses intermeshed gears operable to redirect rotational movement between the first and second arms.

5. The automatic valve actuation system of claim 1, wherein the actuation device includes a motor operatively coupled to the one or more arms and operable to rotate the one or more arms and thereby rotate the valve stem.

6. The automatic valve actuation system of claim 5, wherein the actuation device further includes:
a drive shaft extending from the motor; and
a coupling that operatively couples the drive shaft to the one or more arms such that rotational energy from the motor is transferred to the one or more arms.

7. The automatic valve actuation system of claim 1, further comprising a revolution counter operatively coupled to at least one of the one or more arms and operable to count revolutions of the one or more arms.

8. The automatic valve actuation system of claim 1, further comprising a control system comprising an electronic interface and a first data storage device, wherein the control system is communicatively coupled to a communication element of the actuation device via a communications link.

9. The automatic valve actuation system of claim 8, wherein the communication element comprises a processor and a second data storage device, wherein the processor is programmed to receive commands from the control system and alter operation of the actuation device.

10. The automatic valve actuation system of claim 1, wherein the actuation device further comprises:
a plurality of support arms that provide lateral support to the actuation device.

11. A method of actuating a valve, comprising:
placing an actuation device near the valve, the actuation device including a motor operatively coupled to one or more arms extending from the actuation device;
adjusting an angle of the actuation device relative to horizontal via one or more adjustable legs operatively coupled to the actuation device;
operatively coupling a distal end of the one or more arms to a valve stem of the valve; and
operating the actuation device and thereby rotating the one or more arms to rotate the valve stem between an open position and a closed position.

12. The method of claim 11, wherein the actuation device is communicably coupled to a control system and wherein operating the actuation device comprises operating the actuation device via the control system.

13. The method of claim 11, wherein operatively coupling the distal end of the one or more arms to the valve stem comprises:
removing a handwheel from the valve stem;
installing a stem adapter on the distal end of the one or more arms; and
operatively coupling the stem adapter to the valve stem.

14. The method of claim 11, wherein the one or more arms include a first arm and a second arm, the method further comprising:
installing a transfer joint between opposing ends of the first and second arms; and
using the transfer joint to orient the distal end of the second arm to locate operatively couple to the valve stem.

15. The method of claim 11, further comprising:
prior to operating the actuation device, determining a number of turns required to fully actuate the valve;
counting a number of revolutions of the valve stem with a revolution counter as the one or more arms rotate; and
ceasing operation of the actuation device before reaching the number of turns required to fully actuate the valve.

16. The automatic valve actuation system of claim 1, wherein the variety of angles relative to horizontal comprise angles that are non-parallel to horizontal.

17. The automatic valve actuation system of claim 7, wherein the revolution counter is arranged at a direct interface between the actuation device and a first of the one or more arms.

18. The method of claim 11, further comprising inserting a first end of one or more support arms into corresponding apertures on the actuation device to provide lateral support.

19. The method of claim 18, further comprising inserting a second end of the one or more support arms into an underlying surface, floor, substrate, or any combination thereof.

20. The method of claim 11, wherein adjusting the angle of the actuation device relative to horizontal comprises orienting the actuation device at an angle that is non-parallel to horizontal.

* * * * *